United States Patent
Archer et al.

(10) Patent No.: US 7,506,197 B2
(45) Date of Patent: Mar. 17, 2009

(54) MULTI-DIRECTIONAL FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 11/052,661

(22) Filed: Feb. 7, 2005

(65) Prior Publication Data

US 2006/0179269 A1      Aug. 10, 2006

(51) Int. Cl.
  *G06F 11/00* (2006.01)
(52) U.S. Cl. .......................... 714/4; 709/223
(58) Field of Classification Search ........... 714/4
  See application file for complete search history.

(56) References Cited

U.S. PATENT DOCUMENTS

| | | | |
|---|---|---|---|
| 4,320,508 A | 3/1982 | Takezoe | |
| 5,230,047 A * | 7/1993 | Frey et al. | 714/4 |
| 5,325,518 A * | 6/1994 | Bianchini, Jr. | 714/31 |
| 5,537,653 A | 7/1996 | Bianchini, Jr. | |
| 5,561,769 A | 10/1996 | Kumar et al. | |
| 5,684,807 A * | 11/1997 | Bianchini et al. | 714/712 |
| 5,920,267 A | 7/1999 | Tattersall et al. | |
| 6,108,796 A | 8/2000 | Lasken | |
| 6,714,552 B1 | 3/2004 | Cotter | |
| 6,880,100 B2 * | 4/2005 | Mora et al. | 714/4 |
| 7,058,848 B2 | 6/2006 | Sicola et al. | |
| 7,139,925 B2 | 11/2006 | Dinker et al. | |
| 7,149,920 B2 | 12/2006 | Blumrich et al. | |
| 2001/0052084 A1 | 12/2001 | Huang et al. | |
| 2002/0133756 A1 | 9/2002 | Jain | |
| 2003/0023893 A1 * | 1/2003 | Lee et al. | 714/4 |
| 2003/0198251 A1 | 10/2003 | Black et al. | |
| 2005/0198097 A1 | 9/2005 | Kalnitsky | |
| 2005/0246569 A1 * | 11/2005 | Ballew et al. | 714/4 |
| 2006/0117212 A1 | 6/2006 | Meyer et al. | |

OTHER PUBLICATIONS

Park et al. 'Fault-Tolerant Broadcasting in Wormhole-Routed Torus Networks'. 2002. IEEE computer society.*
Azeez et al. 'I/O Node Placement for Performance and Reliability in Torus Networks'.*
Almasi et al. Optimization of MPI Collective Communication on Bluegene/L Systems. Jun. 2005. ACM.*

* cited by examiner

*Primary Examiner*—Yolanda L Wilson
(74) *Attorney, Agent, or Firm*—Wood, Herron & Evans, LLP

(57) ABSTRACT

An apparatus, program product and method checks for nodal faults in a group of nodes comprising a center node and all adjacent nodes. The center node concurrently communicates with the immediately adjacent nodes in three dimensions. The communications are analyzed to determine a presence of a faulty node or connection.

10 Claims, 3 Drawing Sheets

MULTI-DIRECTIONAL FAULT DETECTION SYSTEM

This invention was made with Government support under Contract No. B519700 awarded by the Department of Energy. The Government has certain rights in this invention.

CROSS-REFERENCE TO RELATED APPLICATIONS

This application is related to the following U.S. Patent Applications all filed on even date herewith by Charles Jens Archer et al.: Ser. No. 11/052,658, entitled "ALL-TO-ALL SEQUENCED FAULT DETECTION SYSTEM," Ser. No. 11/052,659, entitled "CELL BOUNDARY FAULT DETECTION SYSTEM," Ser. No. 11/052,660, entitled "ROW FAULT DETECTION SYSTEM," Ser. No. 11/052,663, entitled "BISECTIONAL FAULT DETECTION SYSTEM," and Ser. No. 11/052,662, entitled "ALL ROW, PLANAR FAULT DETECTION SYSTEM,". The present application is also related to U.S. Patent Application filed on even date herewith by John A. Gunnels et al., Ser. No. 11/050,945, entitled "SYSTEM AND METHOD FOR DETECTING A FAULTY OBJECT IN A SYSTEM," Each of these applications is incorporated by reference herein.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system.

The relatively large number of nodes used in some such systems, however, can complicate node maintenance. Ironically, the very redundancy that enables fault tolerance can sometimes challenge processes used to find faulty nodes. With so many nodes and alternative data paths, it may be difficult to pinpoint the address, or even the general region of a node, or nodal connection requiring service.

As such, a significant need exists for a more effective way of determining and locating faulty nodes in a parallel processing environment.

SUMMARY OF THE INVENTION

The invention addresses these and other problems associated with the prior art by providing an apparatus, program product, and method of determining nodal faults in a group of nodes comprising a center or other designated node, and all adjacent nodes. The center node may concurrently communicate with the adjacent nodes in three dimensions, i.e., multiple directions. The communications are analyzed to determine a presence of a faulty node or connection. An adjacent node for purposes of this specification may include a node having a direct connection to another.

Where desired, complete analysis of the group communications may be accomplished prior to moving on to another group for subsequent evaluation. This sequencing, e.g., by not evaluating all groups at once, may mitigate instances where the system could become saturated, or overwhelmed by receiving too much data at once.

The information pertaining to the nodal fault may be logged and/or used to initiate servicing of the fault. The communications may further be evaluated in terms of latency and bandwidth conformance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
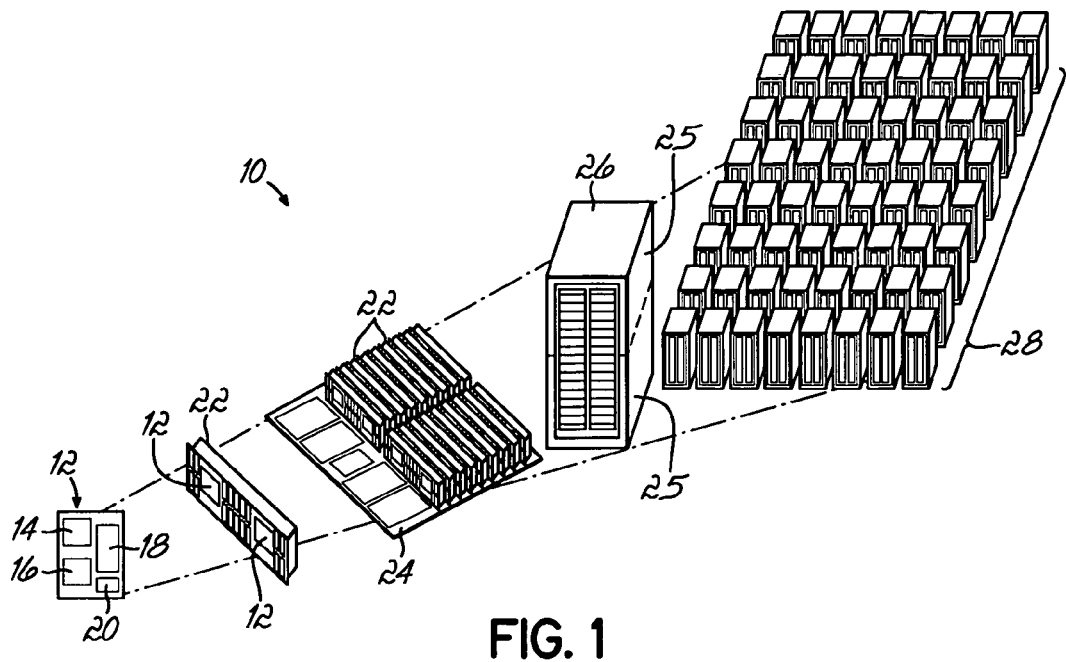
FIG. 1 is a block diagram that includes components of a parallel processing system configured to detect nodal faults using a scalable algorithm that sends packets from a designated node to adjacent nodes in multiple directions.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the present invention provide a system configured to check for nodal faults in a group of nodes comprising a center node and all nodes proximally and/or logically adjacent to the center node. The center node concurrently communicates with the adjacent nodes in all dimensions to generate data used to evaluate the group, or communicator. To this end, the communications between the nodes are analyzed to determine a presence of a faulty node or connection.

More particularly, nodes of the system determine a number of nodes involved in a communication. Designated nodes may either send or receive a message from the center node. The message may be timed to determine bandwidth and/or latency. The center node may report an average of the bandwidth of the communications, or may report the individual communication times for message to pinpoint a malfunctioning link.

The center node then moves the center node to the next node in the system. In this way, every node tests all of its links. The test shows which node(s) and which link(s) might be malfunctioning because each step tests a very isolated part of the entire machine. All of the communication may be accomplished over single hop paths.

Because each step can be configured to have the center node send data, receive data, or both, embodiments may be used to test unidirectional links for proper functionality as well. Embodiments may also be used to identify individual links or nodes with multiple links that are performing poorly.

The test assumes that all links are functioning. However, the test could be implemented with a more rigorous master/slave arrangement similar to the synchronized all-to-all personalized test. In this diagnostic, the number of steps is equal to the number of processors configured. During each step, a master node determines which node will be the center of a communications stencil, and which nodes border the center node. The master node then broadcasts the active nodes' ranks to all of the active nodes.

Turning to the Drawings, wherein like numbers may denote like parts throughout several views, FIG. 1 shows components 12, 22, 24, 26 of a parallel processing system 28 configured to check for nodal faults in a group of nodes comprising a center node and all adjacent nodes, i.e., multi-direction, or six-direction checking. FIG. 1 more particularly shows a parallel computing system 28, or apparatus, such as the BlueGene/L system created by International Business Machines. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two Application Specific Integrated Circuits (ASIC's) 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary highspeed and low latency networks. The networks typically include a three-dimensional torus network that wraps around the edges, and a combining tree network for fast global operations. The torus network includes point-to-point, serial links between routers embedded within the system ASIC—s. As such, each ASIC has six nearest-neighbor connections, some of which may traverse relatively long cables.

Though not shown, the system 28 may include a front end, host computer used for compiling, diagnostics and/or analysis. An I/O node of the system 28 may handle communications between a compute node and other systems, including the host and file servers. The choice of host may depend on the class of applications, as well as their bandwidth and performance requirements.

Figure 2:
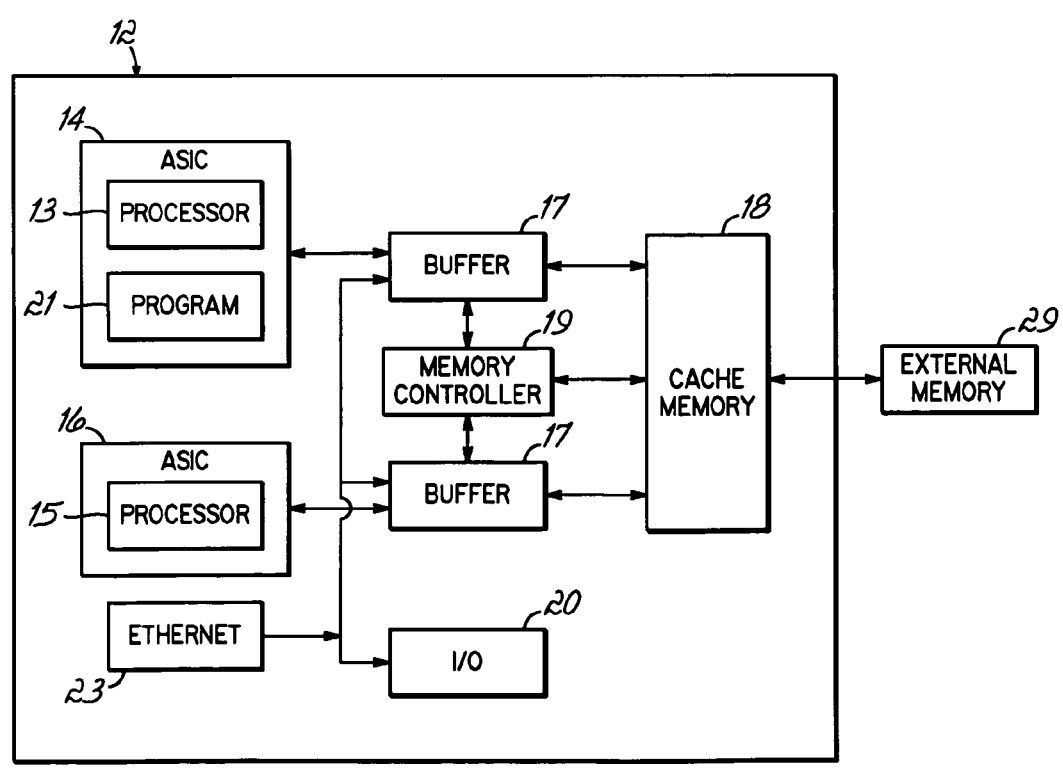
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on-chip memory. An on-chip memory controller 19 provides access to cache memory 18, such as Synchronous Dynamic Random Access Memory (SDRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the cache memory 18, memory controller 19, memory 29 and associated buffers 17. Furthermore, one or more of the processors 13, 15 may couple to a number of external devices, including an input/output interface 20, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above-described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable conducting a multi-directional nodal fault test. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
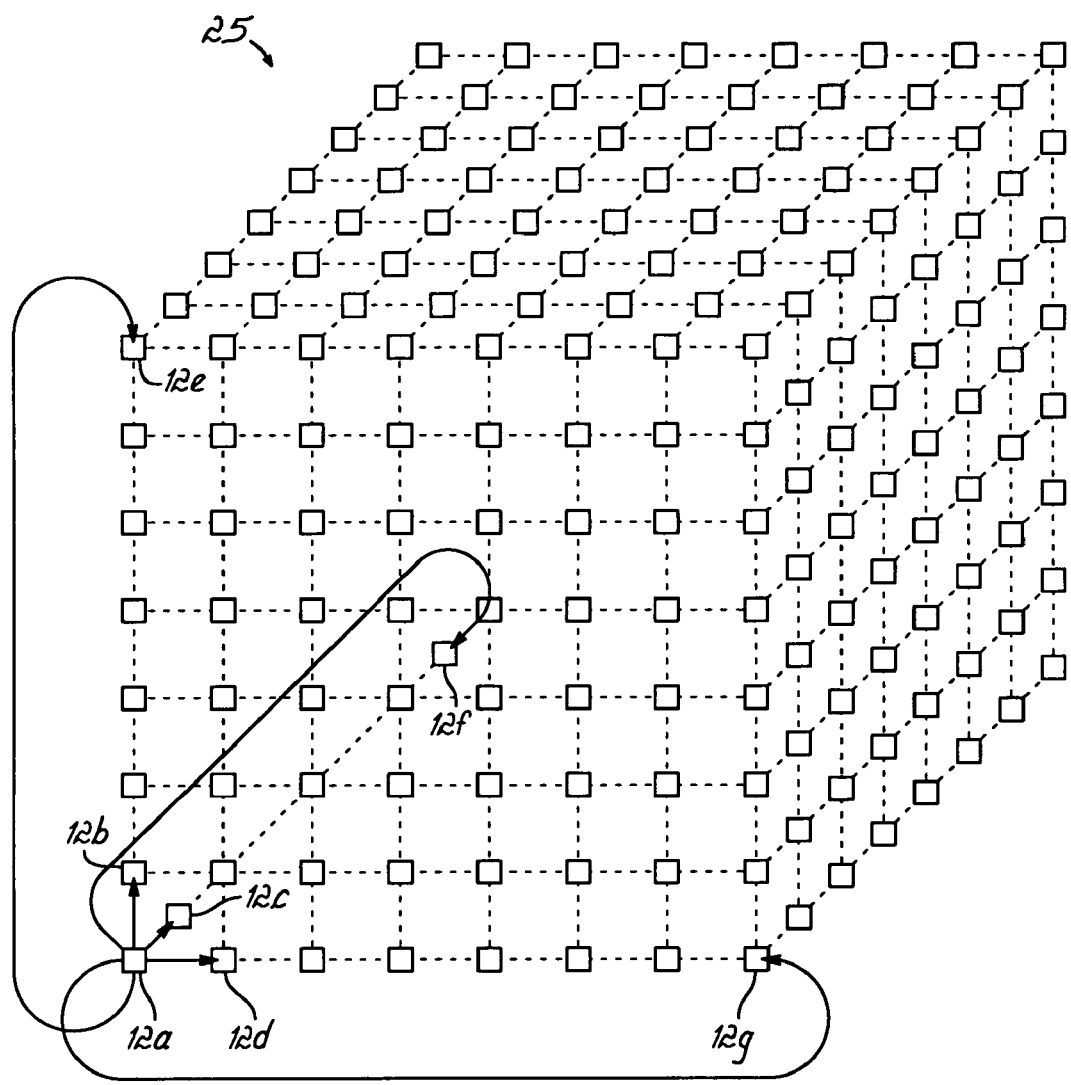
FIG. 3 is a block diagram of a midplane of the parallel processing system of FIG. 1.

FIG. 3 is a block diagram of a midplane, or cell 25, of the parallel processing system 28 of FIG. 1. The cell 25 includes an eight-by-eight-by-eight structure of 512 interconnected computing nodes. In the context of the present invention, the cell 25 includes a grouping of nodes 12a-12g, or a communicator. The communicator includes a center node 12a, having coordinates (0,0,0). The center node 12a is configured to communicate with neighboring nodes 12b-12g. As shown in FIG. 3, the torus network of the cell 25 permits the node 12a to wrap around and communicate with nodes 12e-12g, in addition to proximally adjacent nodes 12b-12d. As such, the term, "adjacent," for purposes of the specification may include logically and proximally neighboring nodes, i.e., sharing a direct connection. After the communications are complete, the results may be evaluated according to performance and connectivity expectations.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Furthermore, while the nodes 12a-g of FIG. 3 are shown as part of a midplane 25, one skilled in the art will appreciate that any time of cell grouping, or cell, may alternatively comprise the environment for testing. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
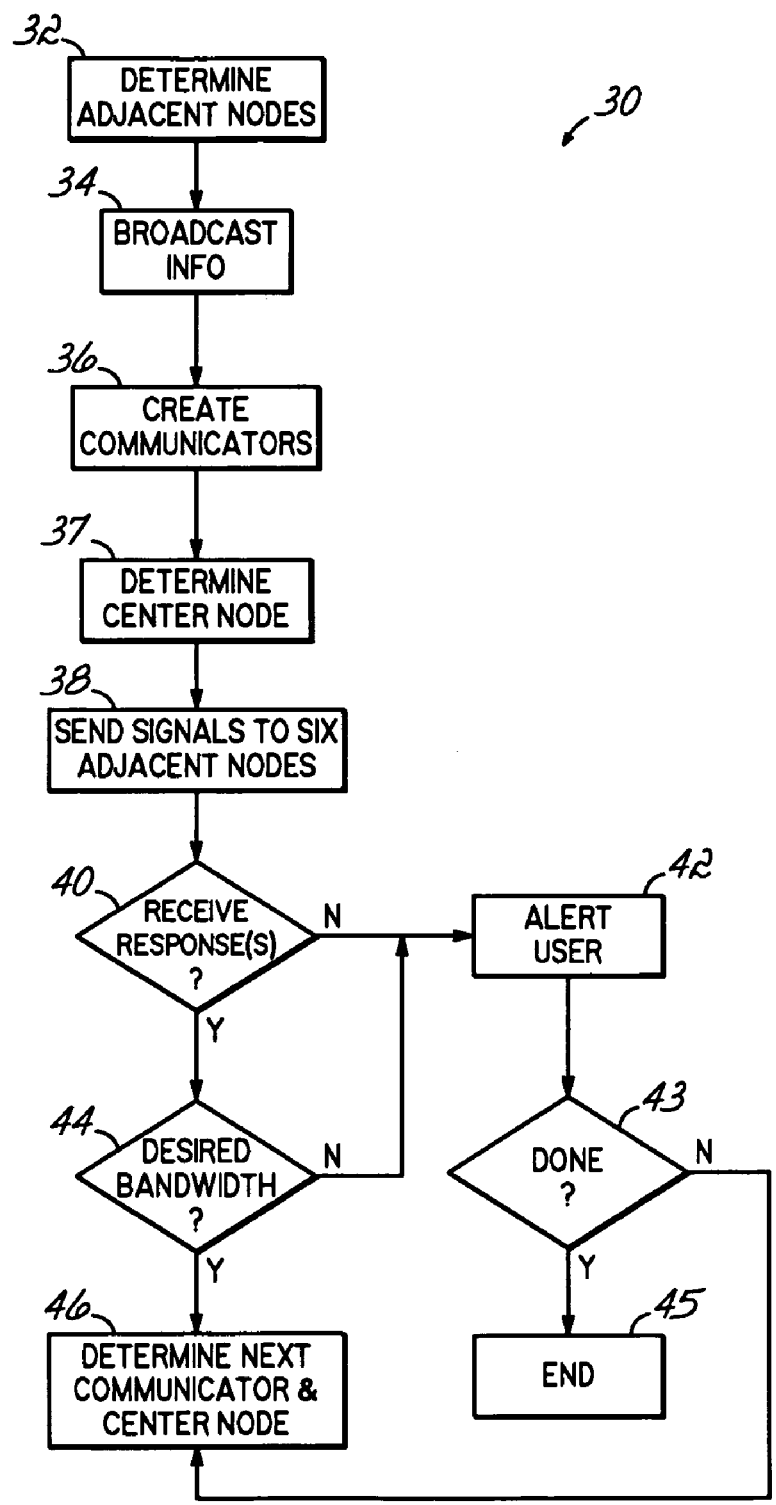
FIG. 4 is a flowchart having a set of exemplary steps executable by the system of FIG. 1 for conducting a multi-directional nodal fault test.

FIG. 4 is a flowchart 30 having a set of exemplary steps executable by the system 28 of FIG. 1 for conducting a multi-directional nodal fault test. More particularly, the flowchart 30 outlines steps used in a six-direction nodal fault test, as may have particular application in the cellular environment of FIG. 3.

To this end, each node 12 of the system 28 may determine at block 32 its neighboring nodes. This determination is facilitated by a personality communication received by each node. The personality communication may comprise a message sent from the control system to each node during startup. The personality communication further includes information used by the ASIC's 14, 16 of each node 12, including the coordinates of the receiving node, as well as the size of cell 25 and/or system 28. As such, a node 12a may execute a hashing function to determine the node 12a is neighbored directly by six nodes 12b, 12c, 12d, 12e, 12f and 12g. Each node 12 may broadcast this relational information at block 34 for the benefit of other nodes 12 in the system 28.

The system 28 and nodes 12 may then at block 36 create one or more communicators, or groupings of nodes, e.g., 12a-g. A center node 12a is determined at block 37 from the respective coordinates of the nodes 12a-g comprising the communicator. This center node 12a may send concurrently at block 38 six signals to each of its adjacent nodes 12b-12g within the communicator. In one embodiment consistent with the invention, an internal counter function may begin timing a testing sequence at block 36. As discussed herein, the timing may be used to evaluate the performance characteristics of data packets communicated within the communicator.

If the center node 12a fails to receive at block 40 six communications (one from each neighboring node 12b-12g), then the system 28 may alert a user at block 42. For instance, an error log may be generated, in addition to an electronic message prompt sent to a system administrator. Generation of an error at block 42 may thus coincide with the presence of a nodal fault somewhere within the communicator. If more links and nodes need to be tested at block 43, then the sequence may continue at block 46. The test may otherwise conclude at block 45.

Where the node alternatively receives the appropriate communications at block 40, then the timing mechanism may cease, and the system 28 may determine if a desired rate of data transmission, or bandwidth, was achieved at block 46. For instance, the system 28 may average the bandwidth of each communication, or alternatively, may report and/or evaluate the bandwidth of each communication individually. In any case, the user may be alerted back at block 42 if the determined bandwidth does not meet some minimum threshold. Though not shown in FIG. 4, one skilled in the art will appreciate that other performance parameters, including latency, may alternatively or additionally be determined at block 46.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for determining a nodal fault within a parallel processing system having a plurality of nodes, the method comprising:
   determining a group comprised of the plurality of nodes;
   designating one node of the group;
   causing the designated node to communicate with adjacent nodes also within the group;
   determining from the communications between the designated node and the adjacent nodes within the group the nodal fault relating to at least one of the plurality of nodes; and
   after communications in the group have completed, creating another group and causing each node of the another group to communicate with another designated node.

2. The method of claim 1, wherein designating the one node further comprises designating a center node of the group.

3. The method of claim 1, wherein causing the designated node to communicate with adjacent nodes further comprises causing the designated and adjacent nodes to communicate concurrently.

4. The method of claim 1, wherein causing the designated node to communicate with adjacent nodes further comprises determining if a first node in the group is adjacent to the designated node.

5. The method of claim 1, further comprising servicing the nodal fault.

6. The method of claim 1, wherein determining the nodal fault includes determining a fault associated with at least one of software, a connection, and another hardware component.

7. The method of claim 1, wherein determining the nodal fault includes determining a latency associated with a nodal communication.

8. The method of claim 1, wherein determining the nodal fault includes determining a bandwidth associated with a nodal communication.

9. The method of claim 1, further comprising storing an indication of the nodal fault.

10. The method of claim 1, further comprising generating a status signal indicative of the communication between the designated node and adjacent nodes.

* * * * *